US010955531B2

(12) United States Patent
Upton et al.

(10) Patent No.: US 10,955,531 B2
(45) Date of Patent: Mar. 23, 2021

(54) FOCAL REGION OPTICAL ELEMENTS FOR HIGH-PERFORMANCE OPTICAL SCANNERS

(71) Applicant: Apple Inc., Cupertino, CA (US)

(72) Inventors: Robert S Upton, Mountain View, CA (US); Andrew J. Sutton, Sunnyvale, CA (US); Ariel Lipson, Tel Aviv (IL); Noel Axelrod, Jerusalem (IL)

(73) Assignee: APPLE INC., Cupertino, CA (US)

( * ) Notice: Subject to any disclaimer, the term of this patent is extended or adjusted under 35 U.S.C. 154(b) by 601 days.

(21) Appl. No.: 15/849,701

(22) Filed: Dec. 21, 2017

(65) Prior Publication Data

US 2018/0372847 A1    Dec. 27, 2018

Related U.S. Application Data

(60) Provisional application No. 62/522,725, filed on Jun. 21, 2017.

(51) Int. Cl.
| | |
|---|---|
| *G01C 3/08* | (2006.01) |
| *G01S 7/481* | (2006.01) |
| *G01S 17/08* | (2006.01) |
| *G01S 17/42* | (2006.01) |
| *G02B 26/10* | (2006.01) |

(52) U.S. Cl.
CPC .......... *G01S 7/4817* (2013.01); *G01S 7/4816* (2013.01); *G01S 17/08* (2013.01); *G01S 17/42* (2013.01); *G02B 26/105* (2013.01)

(58) Field of Classification Search
CPC ........ G01S 7/4816; G01S 17/08; G01S 17/42; G01S 7/4817; G02B 26/105
See application file for complete search history.

(56) References Cited

U.S. PATENT DOCUMENTS

| | | | |
|---|---|---|---|
| 4,457,621 A | 7/1984 | Harris et al. | |
| 5,506,394 A | 4/1996 | Plesko | |
| 6,005,722 A | * 12/1999 | Butterworth | ......... H04N 9/3114 348/742 |
| 7,588,187 B2 | 9/2009 | Barkan et al. | |
| 7,925,129 B2 | 4/2011 | Ghosh et al. | |
| (Continued) | | | |

FOREIGN PATENT DOCUMENTS

WO     2006085834 A1    8/2006

OTHER PUBLICATIONS

U.S. Appl. No. 15/849,696 office action dated Apr. 2, 2019.
(Continued)

*Primary Examiner* — Samantha K Abraham
(74) *Attorney, Agent, or Firm* — Kligler & Associates Patent Attorneys Ltd

(57) ABSTRACT

An optical device includes a light source, which is configured to emit a beam of light, and a sensor having a detection area. At least one scanning mirror is configured to scan the beam across a target scene. Light collection optics include a collection lens positioned to receive the light from the scene that is reflected from the at least one scanning mirror and to focus the collected light onto a focal plane, and a non-imaging optical element having a front surface positioned at the focal plane of the collection lens and a rear surface in proximity to the sensor and configured to spread the light focused by the collection lens over the detection area of the sensor.

8 Claims, 4 Drawing Sheets

(56) References Cited

U.S. PATENT DOCUMENTS

| | | | |
|---|---|---|---|
| 8,783,866 B2* | 7/2014 | Hart | A61B 5/0066 |
| | | | 351/206 |
| 9,068,917 B1 | 6/2015 | Vaez-Iravani et al. | |
| 2002/0130264 A1 | 9/2002 | Wichner | |
| 2007/0181786 A1 | 8/2007 | Doemens et al. | |
| 2013/0223846 A1* | 8/2013 | Joseph | G02B 27/0944 |
| | | | 398/119 |
| 2014/0240691 A1* | 8/2014 | Mheen | G01S 7/4815 |
| | | | 356/4.07 |
| 2015/0168554 A1 | 6/2015 | Aharoni et al. | |
| 2016/0146939 A1 | 5/2016 | Shpunt et al. | |
| 2016/0313445 A1 | 10/2016 | Bailey et al. | |
| 2017/0214839 A1 | 7/2017 | Keller et al. | |
| 2017/0242109 A1* | 8/2017 | Dussan | G01S 17/42 |
| 2017/0245747 A1* | 8/2017 | Soudagar | A61B 1/055 |
| 2017/0269215 A1 | 9/2017 | Hall et al. | |
| 2017/0352771 A1 | 12/2017 | Gu et al. | |
| 2018/0224530 A1 | 8/2018 | Ishikawa | |

OTHER PUBLICATIONS

Axelrod et al., U.S. Appl. No. 15/849,696 dated Dec. 21, 2017.
International Application # PCT/US2018/41179 search report dated Oct. 26, 2018.
International Application # PCT/US2019/042106 search report dated Oct. 30, 2019.

* cited by examiner

FOCAL REGION OPTICAL ELEMENTS FOR HIGH-PERFORMANCE OPTICAL SCANNERS

CROSS-REFERENCE TO RELATED APPLICATION

This application claims the benefit of U.S. Provisional Patent Application 62/522,725, filed Jun. 21, 2017, which is incorporated herein by reference.

FIELD OF THE INVENTION

The present invention relates generally to opto-electronic devices, and particularly to optical scanners.

BACKGROUND

Optical scanners are widely used for optically probing extended objects or target scenes. In a typical scanner a light source sends out a beam of light; the beam is scanned across the object by, for instance, a scanning mirror; then the light returned from the object is collected by collection optics and is directed to a sensor. The sensor emits a signal to a controller for further analysis.

High-performance optical scanners typically use both high-power light beams and high-speed scanners in order to sample and sense distant target scenes with high temporal and spatial resolution with a good signal-to-noise ratio.

SUMMARY

Embodiments of the present invention that are described hereinbelow provide improved optical scanners and methods for scanning.

There is therefore provided, in accordance with an embodiment of the invention, an optical device, including a light source, which is configured to emit a beam of light, at least one scanning mirror configured to scan the beam across a target scene, and a sensor having a detection area. Light collection optics include a collection lens positioned to receive the light from the scene that is reflected from the at least one scanning mirror and to focus the collected light onto a focal plane, and a non-imaging optical element having a front surface positioned at the focal plane of the collection lens and a rear surface in proximity to the sensor and configured to spread the light focused by the collection lens over the detection area of the sensor.

In a disclosed embodiment, the rear surface of the non-imaging optical element is in contact with the sensor.

In some embodiments, the non-imaging optical element includes a ball lens. In one embodiment, the ball lens is configured to image a pupil of the collection lens onto the sensor.

In other embodiments, the non-imaging optical element includes a compound parabolic concentrator (CPC) having an entrance oriented toward the collection lens and an exit oriented toward the sensor, and a transmitting diffuser extending across the entrance of the CPC. In one embodiment, the transmitting diffuser is in contact with the entrance of the CPC.

In some embodiments, the beam of light includes a beam of light pulses, and the sensor is configured to output a signal indicative of a time of incidence of a single photon on the sensor. Typically, the apparatus includes a controller, which is configured to find times of flight of the light pulses to and from points in the scene responsively to the signal.

There is also provided, in accordance with an embodiment of the invention, a method of sensing, which includes scanning a beam of light across a target scene using at least one scanning mirror. The light from the scene that is reflected from the at least one scanning mirror is collected and focused onto a focal plane. A front surface of a non-imaging optical element is positioned at the focal plane. The collected light is sensed using a sensor positioned in proximity to a rear surface of the non-imaging optical element, which spreads the collected light over a detection area of the sensor.

The present invention will be more fully understood from the following detailed description of the embodiments thereof, taken together with the drawings in which:

DETAILED DESCRIPTION OF EMBODIMENTS

Overview

Figure 1:
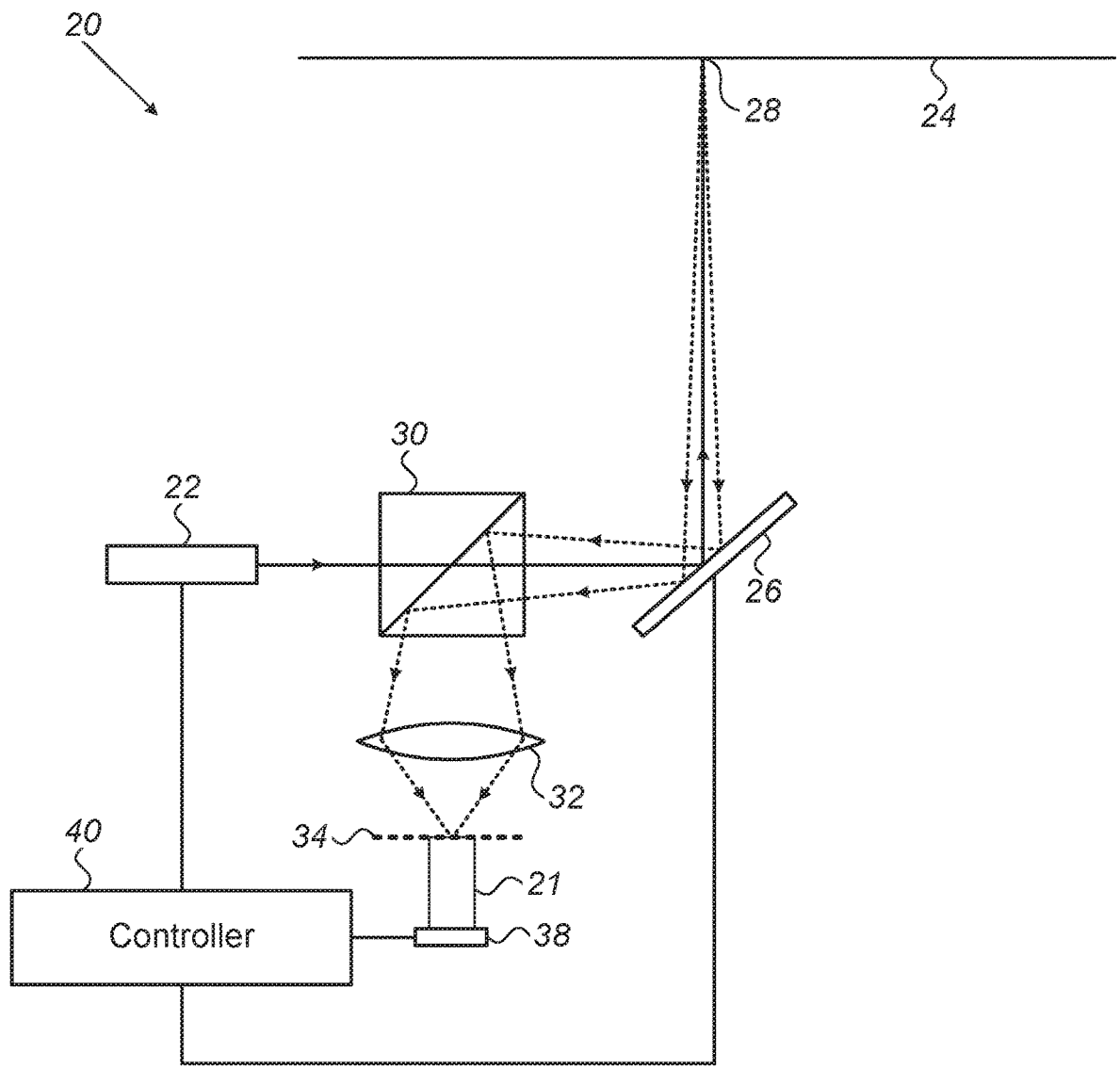
FIG. 1 is a schematic side view of an optical scanner with a non-imaging optical element, in accordance with an embodiment of the invention.

High-performance optical scanners, for instance light detection and ranging (LiDAR) sensors, typically use both high-intensity light beams and high-speed scanners in order to sample and sense distant target scenes with high spatial and temporal resolution with a good signal-to-noise ratio. The distance to the target scene may range from tens of centimeters to hundreds of meters.

The beam emitted by the light source is scanned across the target scene by a high-speed scanner, for instance by a rapidly oscillating scanning mirror. The light returned from the scene is reflected by a scanning mirror (either the scanning mirror described above or another mirror synchronized to the above mirror) towards a collection lens. An imaging collection lens focuses the returned light into a small spot on the sensor, and the signal emitted by the sensor is received by a controller for further analysis.

High-speed scanners are employed in this application to maximize the measurement rate. At very high angular speeds, the round-trip time for light can introduce a lag angle at the receiver. In order to compensate for deviations of the focused spot due to the scanner, a large sensing area is required. Furthermore, small focused spots of both returned light and scattered light have a very high irradiance that can damage the sensor and possibly degrade detection efficiency.

The embodiments of the present invention that are described herein address the above limitations so as to enable high-speed, high-resolution optical scanners utilizing a sensor with high bandwidth, low dark noise, and reduced potential for damage and saturation. The disclosed embodiments use a non-imaging optical element positioned between the focal plane of the collection optics and the sensor. This arrangement affords at least the following advantages:

1) The beam returned from the target scene and focused by the collection optics is spread on the sensor over an area that is larger than the spot in the focal plane; and
2) The beam is stabilized on the sensor to a position that is essentially independent of the mirror speed and target distance.

The use of a non-imaging optical element enables reducing the detection area of the sensor relative to what would otherwise be required in the absence of the non-imaging optics, as well as lowering the peak irradiance on the sensor. Both advantages result in larger signal bandwidth and longer detection ranges than could otherwise be achieved without the extra-focal elements.

The disclosed embodiments of the present invention provide optical scanners, wherein the light source can be either a non-laser source (such as a thermal source, a solid state source or a gas discharge source) or a laser source (either continuous-wave or pulsed). Such scanners can be used in depth-mapping systems, such as LIDARs, wherein the light source is a pulsed laser source, the sensor is a single-photon avalanche diode (SPAD), and a controller finds the distance to the target scene by time-of-flight analysis.

In alternative embodiments, other high-sensitivity sensors, such as an avalanche photodiode (APD), may be used.

System Description

FIG. 1 is a schematic side view of an optical scanner 20 with a non-imaging optical element 21, in accordance with an embodiment of the invention. The beam from a light source 22, such as, for example, a continuous-wave or pulsed laser, is directed to a target scene 24 by a scanning mirror 26, forming and scanning an illumination spot 28 over the target scene. (The terms "light" and "illumination" are used herein to refer to any sort of optical radiation, including radiation in the visible, infrared, and ultraviolet ranges.) The light returned from illumination spot 28 is reflected by scanning mirror 26 and a beamsplitter 30 towards a collection lens 32, which focuses the light onto its focal plane 34.

Non-imaging optical element 21 has its front surface positioned at or near focal plane 34 and its rear surface in proximity to a sensor 38, such as a photodiode, a SPAD, or an APD. Non-imaging optical element 21 is configured to spread the light focused by collection lens 32 over the detection area of sensor 38.

A controller 40 is connected to light source 22, scanning mirror 26, and sensor 38. Controller 40 is configured to drive light source 22 and scanning mirror 26, as well as to receive and analyze signals emitted by sensor 38. In a LIDAR used for mapping the depth of target scene 24, for example, light source 22 comprises a pulsed laser, and sensor 38 comprises a SPAD. Controller 40 measures times of arrival of photons at sensor 38 relative to pulses emitted by light source 22 in order to derive time-of-flights across the target scene and thus to produce a depth map of the target scene.

Figure 2:
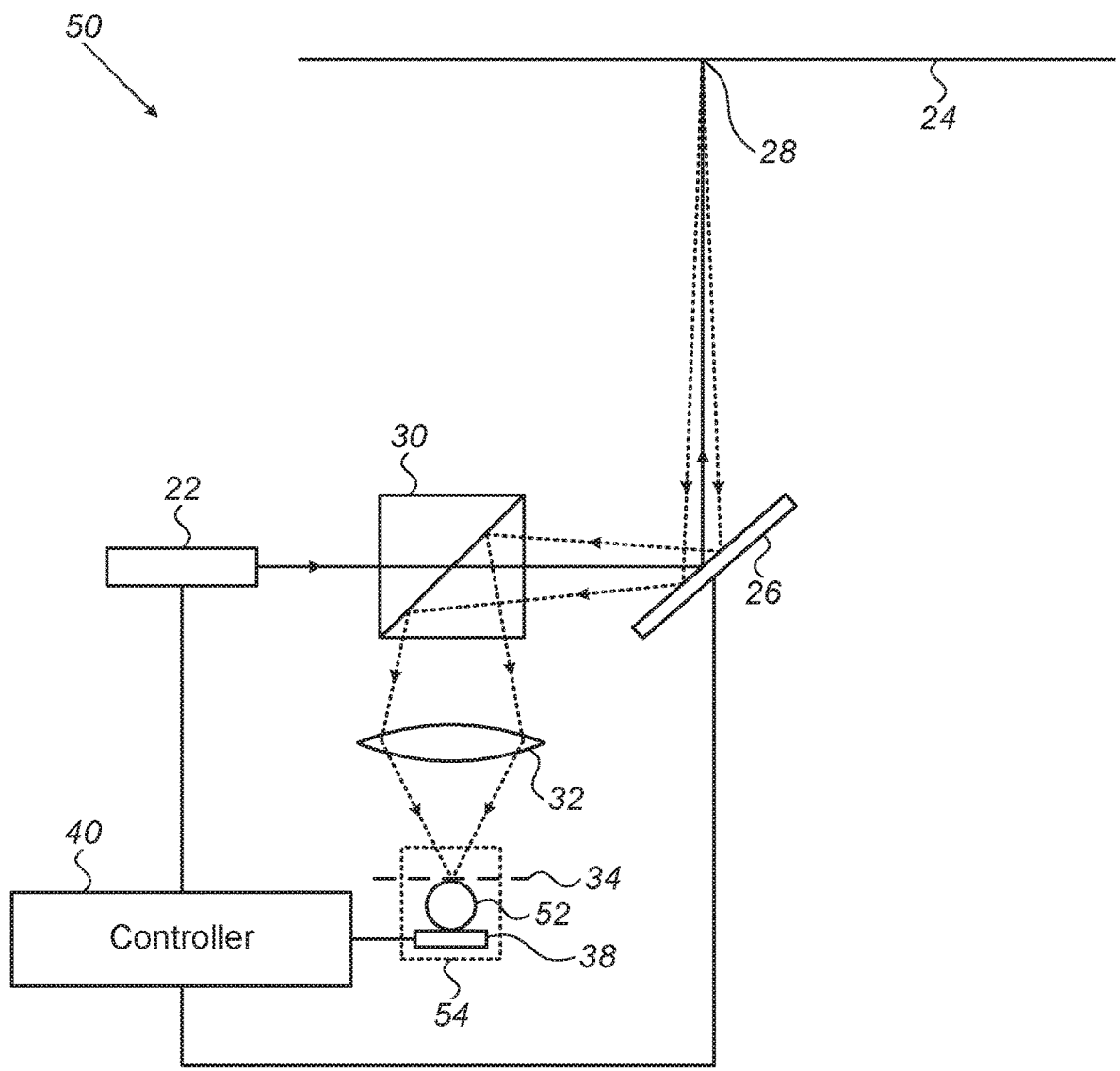
FIG. 2 is a schematic side view of an optical scanner with a ball lens as a non-imaging optical element, in accordance with an embodiment of the invention.
Figure 3B:
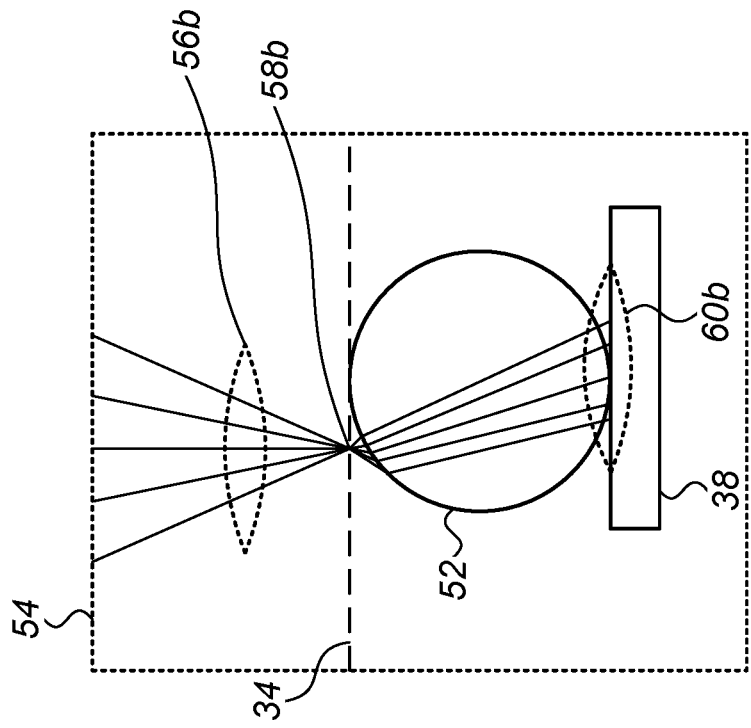
FIGS. 3*a-b* are schematic optical ray trace diagrams, illustrating optical performance of the scanner of FIG. 2 in accordance with an embodiment of the invention.
Figure 3A:
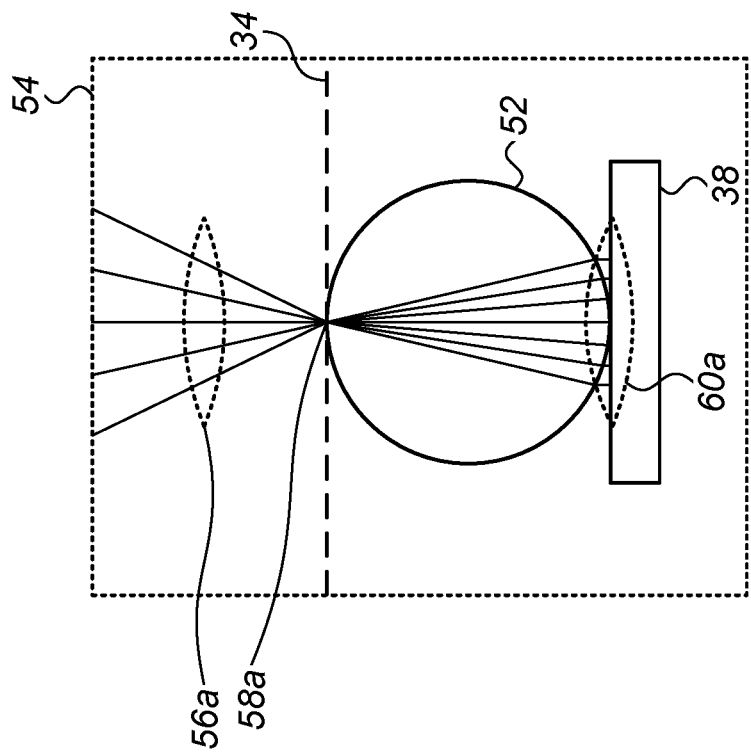
Figure 4:
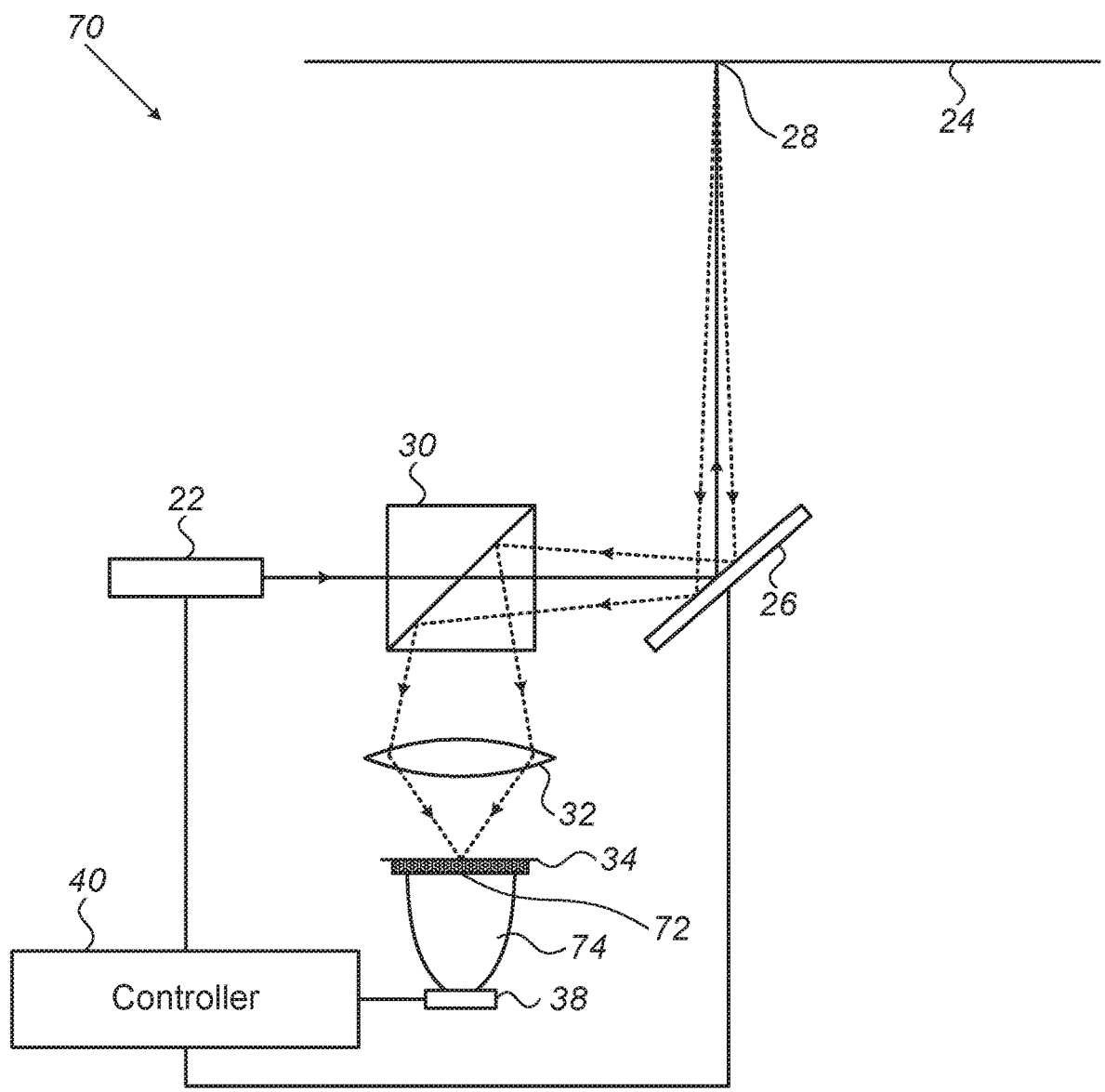
FIG. 4 is a schematic side view of an optical scanner with a combination of a transmitting diffuser and a compound parabolic concentrator (CPC) as a non-imaging optical element, in accordance with an embodiment of the invention.

As will be further detailed in FIGS. 2-4, proper choice of non-imaging optical element 21 enables the use of a sensor 38 with a detection area having smaller dimensions than would be required if the sensor were located directly in focal plane 34. The use of a smaller detection area yields a higher bandwidth and a lower dark noise as compared to a larger sensor. Furthermore, non-imaging optical element 21 spreads the light focused at focal plane 34 over the detection area of sensor 38, thus alleviating the problems that are associated with a high local irradiance.

FIG. 2 is a schematic side view of an optical scanner 50 with a ball lens 52 as a non-imaging optical element, in accordance with an embodiment of the invention. Optical scanner 50 is similar to optical scanner 20 of FIG. 1, with the exception of ball lens 52 replacing generic non-imaging optical element 21 of FIG. 1. Ball lens 52 is positioned with its front surface at focal plane 34 and with its rear surface in contact with or in proximity to sensor 38. A rectangle 54 denotes a part of FIG. 2 which is detailed in FIGS. 3a-b.

FIGS. 3a-b are ray traces showing optical rays 56a-b propagating within rectangle 54 of FIG. 2, in accordance with an embodiment of the invention. In FIG. 3a, optical rays 56a arrive from collection lens 32 to a center point 58a of focal plane 34. As point 58a is located on the vertex of ball lens 52, rays 56a change their direction according to Snell's law as if they had impinged on a plane surface at point 58a, with the surface coinciding with focal plane 34. Rays 56a spread over an area 60a on sensor 38.

In FIG. 3b, optical rays 56b arrive from collection lens 32 to an off-axis point 58b of focal plane 34. Now rays 56b are both spread and refracted by ball lens 52, and they impinge on sensor 38 over an area 60b. Ball lens 52 images the pupil of collection lens 32 onto sensor 38, and area 60b essentially coincides with area 60a of FIG. 3a.

As shown in FIGS. 3a-b, rays arriving from collection lens 32 are spread over area 60a or 60b, respectively, on sensor 38, with the position of areas 60a and 60b being essentially stationary with respect to the varying position of the rays in focal plane 34. This configuration enables the use of a sensor whose dimensions are independent of target distance and scan speed, and typically smaller than would be otherwise required if positioned at the focal plane 34. The spreading of the rays lowers the irradiance on sensor 38 by typically 20 dB, or a factor of 100, relative to what would otherwise be received if the sensor were positioned directly in focal plane 34, alleviating the problems associated with high local irradiance.

FIG. 4 is a schematic side view of an optical scanner 70 with a combination of a transmitting diffuser 72 and a compound parabolic concentrator (CPC) 74 as a non-imaging optical element, in accordance with another embodiment of the invention. Optical scanner 70 is similar to optical scanner 20 of FIG. 1, with the exception of the combination of transmitting diffuser 72 and CPC 74 replacing generic non-imaging optical element 21 of FIG. 1.

A CPC is an optical element with a reflective, concave, rotationally symmetrical surface. The shape of the reflective surface is defined by rotating a section of a parabola (parabolic section) around an axis. This axis is defined as the perpendicular bisector of the line connecting the focal point of the parabola to the point of the parabolic section closest to the focal point. The aperture defined by the rotation of this connecting line forms the exit aperture of the CPC. The entrance aperture of the CPC is determined by a suitable choice of the end-point of the parabolic section away from the exit aperture. The maximal acceptance angle of the CPC, typically tens of degrees, is equal to the tilt angle between the axis of the parabola and the axis of rotation. A CPC is manufactured typically of glass or metal, and its inside is coated with a suitable reflective material, such as aluminum.

Diffuser 72 is positioned at focal plane 34 of collection lens 32. CPC 74 is positioned with its entrance either in contact with or in proximity to diffuser 72, and with its exit in contact with or in proximity to sensor 38.

Diffuser 72 transmits and diffuses the rays focused by collection lens 32 onto the diffuser. The transmitted rays are spread and reflected towards sensor 38 by CPC 74, filling nearly uniformly the exit aperture of the CPC. Thus, independently of the position of the focused rays in focal plane 34, all the rays transmitted by diffuser 72 arrive within the detection area of sensor 38, enabling the use of a sensor whose dimensions are independent of target distance and scan speed. As the exit aperture of CPC 74 is substantially smaller than its entrance aperture, the detection area of sensor 38 can be made substantially smaller than would be required if the sensor were positioned at the focal plane. Due to the nearly uniform filling of the exit aperture of CPC 74, the irradiance of the radiation received by sensor 38 is typically 20 dB lower than the irradiance that a sensor positioned in focal plane 34 would receive, alleviating the problems that are associated with a high local irradiance.

Although the embodiments of non-imaging optical element 21 of FIG. 1 have been described in the embodiments in FIGS. 2 and 4 as ball lens 52 and a combination of transmitting diffuser 72 and CPC 74, respectively, other embodiments of the present invention can use other sorts of non-imaging optical elements that are known in the art, comprising both reflective and refractive optics and diffusers.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
   a light source, which is configured to emit a beam of light;
   at least one scanning mirror configured to scan the beam across a target scene;
   a sensor having a detection area; and
   light collection optics comprising:
      a collection lens positioned to collect the light from the scene that is reflected from the at least one scanning mirror and to focus the collected light onto a focal plane; and
      a non-imaging optical element comprising a ball lens having a front surface positioned at the focal plane of the collection lens and a rear surface in proximity to the sensor and configured to image a pupil of the collection lens onto the sensor so as to spread the light focused by the collection lens over the detection area of the sensor.

2. The optical device according to claim 1, wherein the rear surface of the non-imaging optical element is in contact with the sensor.

3. The optical device according to claim 1, wherein the beam of light comprises a beam of light pulses, and wherein the sensor is configured to output a signal indicative of a time of incidence of a single photon on the sensor.

4. The optical device according to claim 3, and comprising a controller, which is configured to find times of flight of the light pulses to and from points in the scene responsively to the signal.

5. A method of sensing, comprising:
   scanning a beam of light across a target scene using at least one scanning mirror;
   collecting the light from the scene that is reflected from the at least one scanning mirror and focusing the collected light onto a focal plane using a collection lens; and
   positioning a non-imaging optical element comprising a ball lens such that a front surface of the ball lens is positioned at the focal plane; and
   sensing the collected light using a sensor positioned in proximity to a rear surface of the non-imaging optical element, wherein the ball lens images a pupil of the collection lens onto the sensor so as to spread the collected light over a detection area of the sensor.

6. The method according to claim 5, wherein the sensor is positioned in contact with the rear surface of the non-imaging optical element.

7. The method according to claim 5, wherein the beam of light comprises a beam of light pulses, and sensing the collected light comprises sensing the light pulses and emitting a signal indicative of a time of incidence of a single photon on the sensor.

8. The method according to claim 7, and comprising finding times of flight of the light pulses to and from points in the target scene responsively to the signal.

* * * * *